(12) United States Patent
Ge et al.

(10) Patent No.: US 9,784,170 B2
(45) Date of Patent: Oct. 10, 2017

(54) THERMAL MANAGEMENT SYSTEM FOR AFTERTREATMENT SYSTEM

(71) Applicant: Caterpillar Inc., Peoria, IL (US)

(72) Inventors: Xinyu Ge, Peoria, IL (US); Yongli Qi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 36 days.

(21) Appl. No.: 14/854,095

(22) Filed: Sep. 15, 2015

(65) Prior Publication Data

US 2017/0074149 A1 Mar. 16, 2017

(51) Int. Cl.
*F01N 3/00* (2006.01)
*F01N 13/14* (2010.01)

(52) U.S. Cl.
CPC ............................... *F01N 13/143* (2013.01)

(58) Field of Classification Search
CPC .................................................. F01N 13/143
USPC .......................................................... 60/289
See application file for complete search history.

(56) References Cited

U.S. PATENT DOCUMENTS

| | | | |
|---|---|---|---|
| 5,357,752 A | 10/1994 | Lucchesi | |
| 5,412,943 A * | 5/1995 | Hosoya | F01N 3/22 60/276 |
| 5,459,999 A * | 10/1995 | Hosoya | F01N 3/2006 60/284 |
| 5,517,848 A * | 5/1996 | Hosoya | F01N 3/22 73/114.75 |
| 5,666,804 A * | 9/1997 | Sekiya | F01N 3/2006 219/205 |
| 5,675,968 A * | 10/1997 | Katashiba | F01N 3/2006 60/276 |
| 7,128,035 B2 | 10/2006 | Lancaster et al. | |
| 7,469,177 B2 | 12/2008 | Samad et al. | |
| 7,640,731 B2 | 1/2010 | Huang | |
| 7,716,915 B2 | 5/2010 | Muraguchi | |
| 8,056,320 B2 | 11/2011 | Gonze et al. | |
| 8,359,833 B2 | 1/2013 | Nalla et al. | |
| 8,499,739 B2 | 8/2013 | Cox et al. | |
| 2004/0083716 A1* | 5/2004 | Twigg | F01N 3/0814 60/284 |
| 2013/0014832 A1* | 1/2013 | Ida | F01N 3/32 137/334 |
| 2013/0192566 A1 | 8/2013 | Gozloo | |
| 2014/0007846 A1 | 1/2014 | Gutscher et al. | |

(Continued)

FOREIGN PATENT DOCUMENTS

| | | |
|---|---|---|
| GB | 2497955 | 4/2014 |
| JP | 07011952 A * | 1/1995 |
| JP | 3323948 B2 * | 9/2002 |

(Continued)

*Primary Examiner* — Jason Shanske

(57) ABSTRACT

A thermal management system for an aftertreatment system includes an air pump and a compressed air rail. The compressed air rail is fluidly connected with the air pump. The thermal management system further includes a first valve located between the compressed air rail and an exhaust outlet pathway. The first valve is configured to selective supply air to the aftertreatment system of the engine. The thermal management system further includes a heater located between the compressed air rail and the first valve. The heater is configured to heat the air before supplying air to the aftertreatment system of the engine.

14 Claims, 4 Drawing Sheets

(56) References Cited

U.S. PATENT DOCUMENTS

2014/0182272 A1 7/2014 Czimmek

FOREIGN PATENT DOCUMENTS

| JP | WO 2014196267 A1 * | 12/2014 | ............... F01N 3/22 |
| WO | 2014196116 | 12/2014 | |

* cited by examiner

THERMAL MANAGEMENT SYSTEM FOR AFTERTREATMENT SYSTEM

TECHNICAL FIELD

The present disclosure relates to an aftertreatment system of an engine system, and more particularly to a thermal management system for the aftertreatment system.

BACKGROUND

Engine systems include an aftertreatment system to convert the engine exhaust into clean engine exhaust before it is routed to the atmosphere. The aftertreatment system includes a diesel oxidation catalyst (DOC) and a diesel particulate filter (DPF). The DOC may include a honeycomb structure coated with a platinum group catalyst. The DOC is provided to oxidize carbon monoxide, unburned hydrocarbons, and the soluble organic fraction (SOF) of diesel particulates to $CO_2$ and $H_2O$. Further, the DPF is used to trap the particulate matter (PM) or soot produced by diesel engines. The aftertreatment system may also include a selective catalytic reduction (SCR) device also having a catalyst washcoat, and the catalyst washcoat is located downstream of a reductant injector. A gaseous or liquid reductant is sprayed or injected into the engine exhaust upstream of the catalyst washcoat by the reductant injector. As the reductant is absorbed by the catalyst washcoat, the reductant reacts with $NO_x$ (mainly NO and $NO_2$) present in the engine exhaust to form water ($H_2O$) and elemental nitrogen ($N_2$).

The aftertreatment system usually operates at high temperature and is also required to be maintained at the high temperature to achieve an optimal conversion efficiency of the aftertreatment system. For example when an engine starts in cold weather, it is desired to immediately increase the temperature of the aftertreatment system to a certain level, for example, above 300 degrees Celsius, to ensure the optimal conversion efficiency during the engine start-up. In addition, in cold operating conditions whenever there is a hot shutdown of engine system, the aftertreatment system may experience air-to-air thermal shocks. For example, the temperature inside the aftertreatment system may be as high as 600 degrees Celsius when the outside ambient air temperature is about negative 25 degrees Celsius. There is a high temperature gradient across a housing of aftertreatment and thus heat flux across the aftertreatment housing is large. Such thermal shocks accelerate the aging process of the aftertreatment system and reduce its useful life.

U.S. Pat. No. 8,056,320 discloses a cold-start control system including an air pump control module that controls an air pump and an engine starting module that starts an engine. The air pump control module activates the air pump to supply oxygen to a catalytic converter based on a temperature of the catalytic converter. The engine starting module starts the engine based on the temperature of the catalytic converter. However, the disclosed cold-start control system does not solve the problem related to the hot shutdown of the engine, and the aftertreatment system may experience the air-to-air thermal shocks.

SUMMARY OF THE DISCLOSURE

In one aspect of the present disclosure, a thermal management system for an aftertreatment system of an engine is provided. The thermal management system includes an air pump and a compressed air rail. The compressed air rail is fluidly connected with the air pump. The thermal management system further includes a first valve located between the compressed air rail and an exhaust outlet pathway to selective supply air to the aftertreatment system of the engine. Moreover, the thermal management system further includes a heater located between the compressed air rail and the first valve. The heater is configured to heat the air before supplying air to the aftertreatment system of the engine.

In another aspect of the present disclosure, an engine system is provided. The engine system includes an engine and an air intake pathway to supply air to the engine. The engine system further includes an exhaust outlet pathway to route exhaust gases out from the engine and an aftertreatment system to treat the exhaust gases. The engine system includes a thermal management system for the aftertreatment system. The thermal management system includes an air pump and a compressed air rail fluidly connected with the air pump. The thermal management system further includes a first valve located between the compressed air rail and an exhaust outlet pathway. The first valve is configured to selectively supply air to the aftertreatment system of the engine. The thermal management system further includes a heater located between the compressed air rail and the first valve. The heater is configured to heat the air before supplying it to the aftertreatment system of the engine.

In yet another aspect of the present disclosure, a method for operating an engine system is provided. The method includes determining an ambient temperature and a coolant temperature associated with the engine system. The method further includes determining a compressed air temperature in a compressed air rail. The method further includes selectively supplying compressed air to an aftertreatment system of the engine system based on at least one of the ambient temperature, the coolant temperature, and the compressed air temperature.

Other features and aspects of this disclosure will be apparent from the following description and the accompanying drawings.

DETAILED DESCRIPTION

Figure 1:
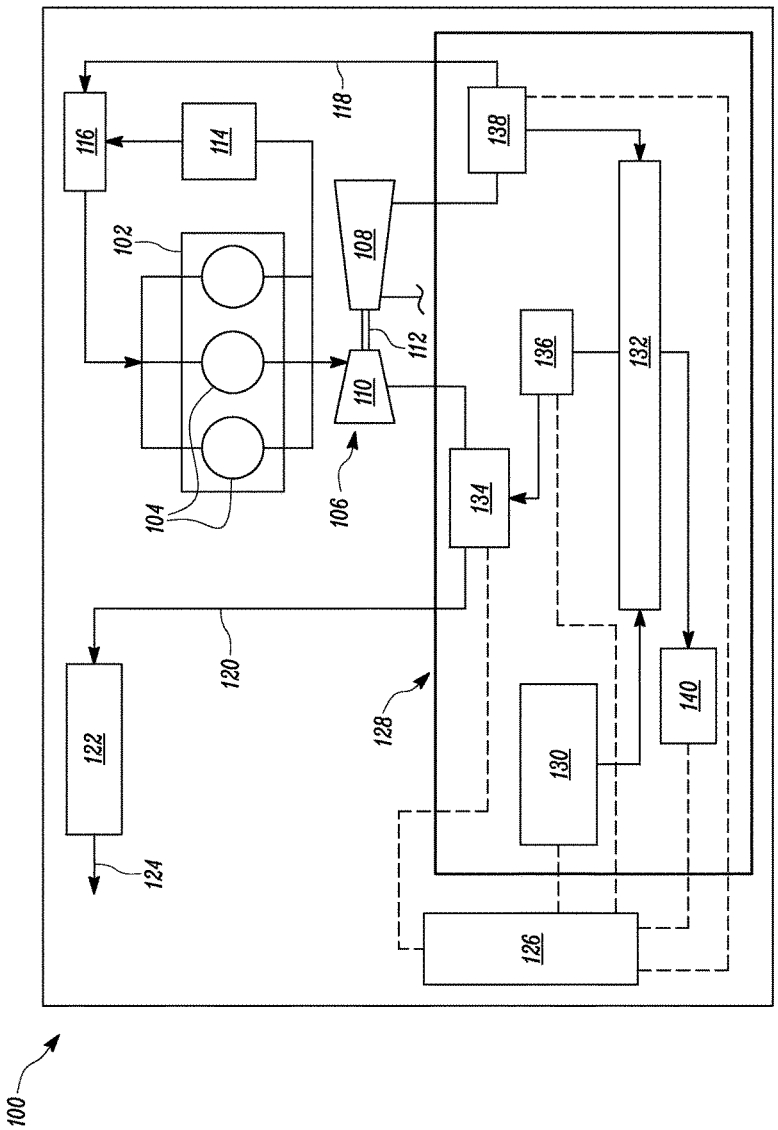
FIG. 1 is a block diagram of an engine system according to an embodiment of the present disclosure.

FIG. 1 is a block diagram of an exemplary engine system 100, according to an embodiment of the present disclosure. The engine system 100 includes an engine 102, which may be an internal combustion engine. The internal combustion engine may be a spark ignition or a compression ignition engine, for example, a diesel engine, a homogeneous charge compression ignition engine, or a reactivity controlled compression ignition engine. The engine 102 may be fueled by gasoline, diesel fuel, biodiesel, dimethyl ether, alcohol, natural gas, propane, hydrogen, or any combination thereof. The engine system 100 may be used in various industries including, but not limited to, transportation, construction, agriculture, forestry, marine, power generation, and material handling.

As shown in FIG. 1, the engine 102 may include a plurality of cylinders 104. The plurality of cylinders 104 may provide a space in which respective pistons travel or reciprocate. The engine system 100 may further include a turbocharger 106. The turbocharger 106 may include a compressor 108 and an exhaust-gas-driven turbine 110. The turbine 110 is connected to the compressor 108 by a shaft 112 and provides the driving force to the compressor 108. In an embodiment, the turbine 110 may include a turbine wheel (not shown) housed in a turbine housing (not shown). The turbine wheel converts a kinetic energy of the engine exhaust gases into mechanical energy to drive the compressor 108. The compressor 108 may be a centrifugal compressor that may include a compressor wheel, a diffuser, and a compressor housing. Based on the rotational speed of the compressor wheel, air may be drawn in axially, accelerated to a high velocity, and then expelled in a radial direction. The diffuser may be formed by a compressor backplate and a part of a volute housing that in turn, may collect the air and may slow it down further before the air reaches an exit of the compressor 108.

The engine system 100 may further include an exhaust gas recirculation (EGR) system 114 that may be a nitrogen oxide (NOx) emissions reduction technique used in the engine system 100. The EGR system 114 may recirculate a portion of the exhaust gas back into the plurality of cylinders 104. The engine system 100 may further include a mixer 116 that may be used to collect and recirculate exhaust gases from the EGR system 114. The engine system 100 may further include an air intake pathway 118 that may supply air to the engine 102. The engine system 100 may further include an exhaust outlet pathway 120 that may be used to route the exhaust gases through an aftertreatment system 122 and out from a tailpipe 124.

The aftertreatment system 122 is configured to treat the exhaust gases exiting the exhaust outlet pathway 120 of the engine 102. The exhaust gases contain emission compounds that may include oxides of nitrogen (NOx), unburned hydrocarbons, particulate matter, and/or other combustion byproducts known in the art. The aftertreatment system 122 may be configured to trap or convert NOx, unburned hydrocarbons, particulate matter, combinations thereof, or other combustion byproducts present in the exhaust gases before exiting the tailpipe 124. The engine system 100 may further include an engine control module (ECM) 126 that may control a series of actuators in the engine system 100 to ensure an optimal performance of the engine 102.

According to an embodiment of the present disclosure, the engine system 100 may further include a thermal management system 128 for the aftertreatment system 122 of the engine system 100. The thermal management system 128 may include an air pump 130, a compressed air rail 132, a first valve 134, a heater 136, a second valve 138 and a relief valve 140. The thermal management system 128 may provide thermal control for the aftertreatment system 122. The thermal management system 128 may avoid thermal shocks in the aftertreatment system 122 and may also supply hot air flow to the aftertreatment system 122 during the cold start of the engine 102.

Figure 2:
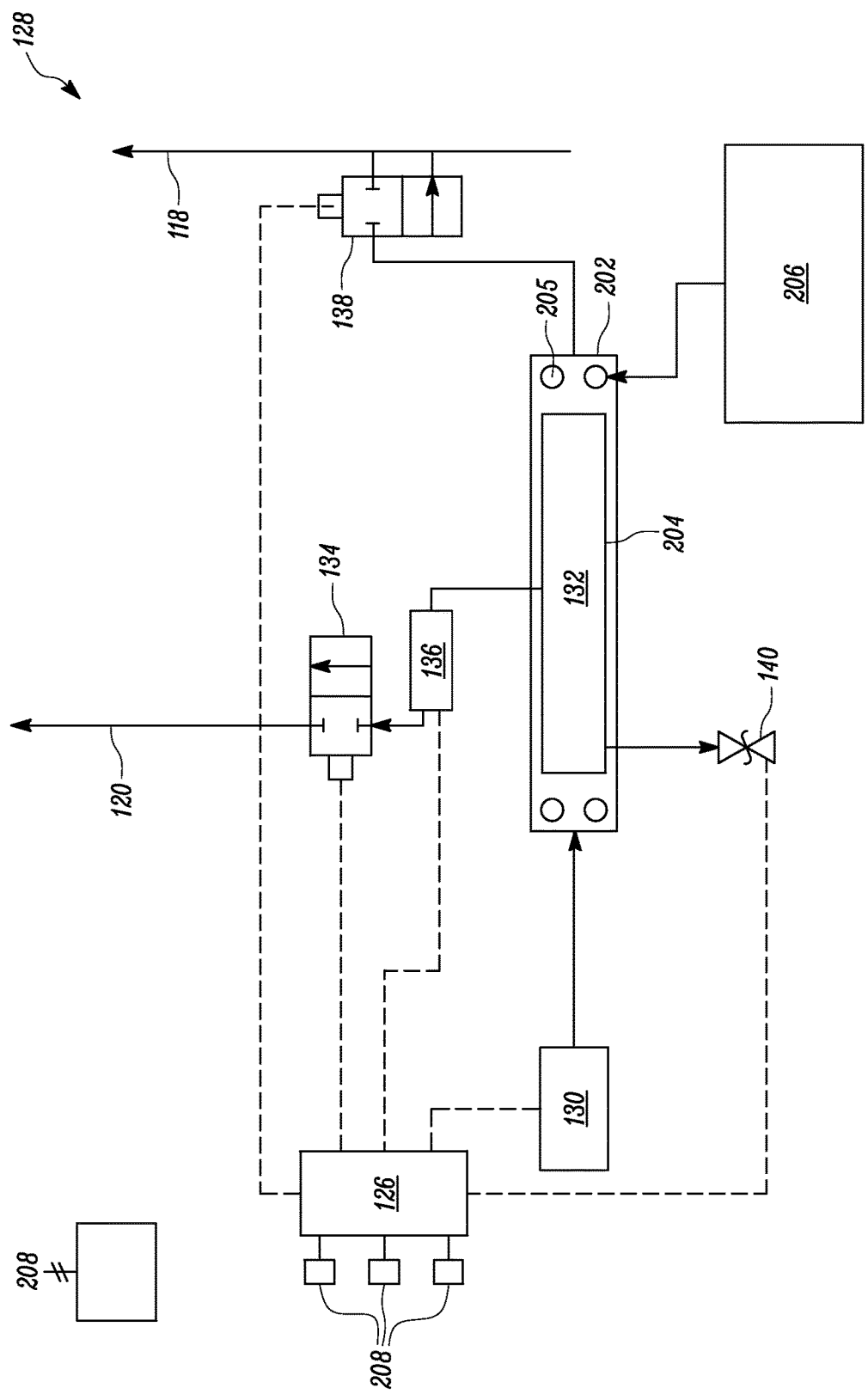
FIG. 2 is a block diagram of a thermal management system according to an embodiment of the present disclosure.

FIG. 2 is a schematic of the thermal management system 128 according to an embodiment of the present disclosure. As illustrated, the compressed air rail 132 may be fluidly connected to the air pump 130. The air pump 130 may be operably connected and driven by an electric motor, or by the electric startup motor of the engine 102, and may be arranged to supply the pressurized air to the compressed air rail 132. Further, the compressed air rail 132 may also receive the pressurized air from the compressor 108 during the engine operation through the second valve 138. In an embodiment, the second valve 138 may be a bypass valve located on the air intake pathway 118 of the engine 102. In an embodiment, the second valve 138 may include a two-way two-position valve.

In an embodiment, the compressed air rail 132 may be a double-layered cylindrical or rectangular housing with a first casing 202, i.e., an outer casing, and a second casing 204, i.e., an inner casing. The thermal management system 128 may also include a heat transfer system 206 that may allow a flow of the engine coolant through coolant passages 205 located between the first casing 202 and the second casing 204 of the compressed air rail 132. The flow of the engine coolant may regulate the temperature of the compressed air in the compressed air rail 132. In an embodiment, while the engine 102 is operating in cold operating conditions and the ambient air temperature is about negative 20 degrees Celsius, the engine coolant flow may keep the air temperature in the compressed air rail 132 above a threshold value, such as, above 50 degrees Celsius.

According to an embodiment, the first valve 134 is located between the compressed air rail 132 and the exhaust outlet pathway 120, and is configured to selectively supply air to the aftertreatment system 122. The first valve 134 may include another two-way two-position valve. The thermal management system 128 may further include the heater 136 located between the compressed air rail 132 and the first valve 134. The heater 136 may be an electric heating system, such as a resistance heating element, an induction heating element, or the like. Furthermore, the relief valve 140 may be connected with the compressed air rail 132. The relief valve 140 may be a spring-loaded pressure relief valve and is configured to discharge any excess pressurized air from the compressed air rail 132.

In an embodiment, the ECM 126 may be operatively connected with the air pump 130 to switch ON or OFF, the air pump 130. The ECM 126 may also control the operation of the first valve 134 and the heater 136, to supply heated or unheated air to the aftertreatment system 122 of the engine system 100. Furthermore, the ECM is operatively connected to the second valve 138 and the relief valve 140 to regulate and maintain a target pressure inside the compressed air rail 132. The ECM 126 may include a processor and a memory component. The processor may include microprocessors or other processors known in the art. In some embodiments, the processor may include multiple processors. The processor may execute instructions for supplying heated or unheated air to the aftertreatment system 122 through the first valve 134 depending on the operating conditions of the engine 102. The processor may also execute instructions for supplying air to the compressed air rail 132 through the air pump 130 and the second valve 138.

According to an embodiment, the ECM 126 may communicate with a plurality of sensors 208, e.g., compressed rail pressure sensor, compressed rail temperature sensor, engine coolant temperature sensor, engine ON/OFF sensor, ambient temperature sensor, etc. Based on the readings from the sensors 208, the ECM 126 determines an engine running condition, such as, a cold start condition or a hot shutdown condition, and accordingly supplies either heated or unheated compressed air to the aftertreatment system 122. In an embodiment, based on a thermal management system ON signal of the engine system 100 the ECM 126 may determine the engine running condition. If the engine system 100 is running before the thermal management system ON signal, the ECM 126 may compare a coolant temperature with an ambient temperature, and if the temperature difference between the coolant temperature and the ambient temperature is greater than, or equal to a first threshold, the ECM 126 determines the hot shutdown condition. Alternatively, when the temperature difference between the coolant temperature and the ambient temperature is less than the first threshold, ECM 126 keeps monitoring the signals from the sensors 208. On the other hand, if the engine system 100 is not running before the thermal management system ON signal, the ECM 126 may compare the ambient temperature with a second threshold, if the ambient temperature is less than the second threshold, the ECM 126 determines the cold start condition. Alternatively, when the ambient temperature is greater than, or equal to the second threshold, ECM 126 may deactivate a cold start mode of the engine system 100 and keep monitoring the signal from the sensors 208.

Upon determining the hot shutdown condition, the ECM 126 may compare the temperature of the compressed air in the compressed air rail 132 with a third threshold. If the temperature of the compressed air is greater than, or equal to the third threshold, the ECM 126 may send a signal to activate/open the first valve 134 to supply unheated air to the aftertreatment system 122. Alternatively, if the temperature of the compressed air is less than the third threshold, the ECM 126 may send signals to activate the first valve 134 and also switch ON the heater 136 to supply heated air to the aftertreatment system 122. Moreover, upon determining the cold start condition, the ECM 126 may send signals to activate the first valve 134 and also switch ON the heater 136 to supply heated air to the aftertreatment system 122.

The threshold values, such as the first threshold, the second threshold and the third threshold are selected based on the engine application and design and are stored in the memory component of the ECM 126. Further, the processor of the ECM 126 may run the logical executions to compare the ambient temperature, coolant temperature and the compressed air temperature in the compressed air rail 132 with the corresponding threshold values.

INDUSTRIAL APPLICABILITY

Figure 3:
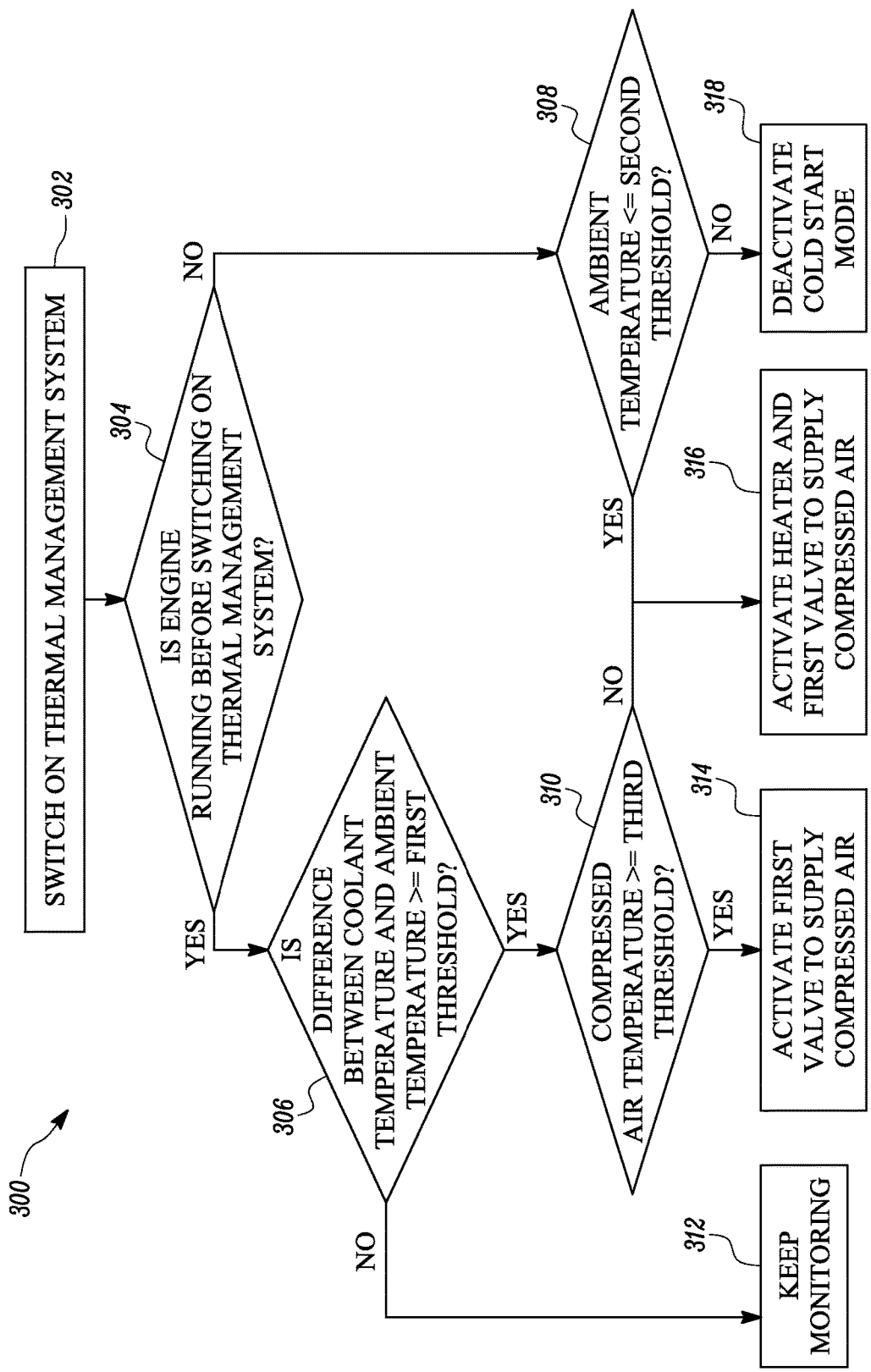
FIG. 3 illustrates a flowchart of a method for operating the thermal management system, according to an embodiment of the present disclosure.

The present disclosure relates to the thermal management system 128 for the aftertreatment system 122 of the engine 102. The thermal management system 128 provides heated or unheated compressed air to the aftertreatment system 122. FIG. 3 illustrates a flowchart of a method 300 for operating the thermal management system 128 according to an embodiment of the present disclosure.

The method 300 starts with block 302 by switching ON the thermal management system 128, and at following block 304, the ECM 126 may determine if the engine 102 is running before switching ON the thermal management system 128. At block 304 the ECM 126 may receive an engine ON/OFF signal from the sensors 208 and if the engine 102 is running before the switching ON of the thermal management system 128 (block 304: Yes), the method 300 moves to block 306. Otherwise, if the engine 102 is not running before switching ON the thermal management system 128 (block 304: No), the method 300 moves to block 308.

At block 306, the ECM may determine the ambient temperature of the engine system 100. The ambient temperature of the engine 102 may be defined as the temperature of the surroundings of the engine 102. The ECM 126 may receive a signal indicative of the ambient temperature from the sensors 208. Further, at block 306, the method 300 includes, determining a coolant temperature of the engine 102 and comparing the same with the ambient temperature. The coolant temperature may be a measure of the temperature of the engine coolant of the engine 102. The temperature of the engine coolant may be fed back to the ECM 126 that may use the data to adjust the fuel injection and ignition timing of the engine system 100. At block 306, the ECM 126 may also receive a coolant signal along with ambient temperature signal from the sensors 208. If the difference between the coolant temperature and the ambient temperature is greater than, or equal to the first threshold (block 306: Yes), the method 300 moves to 310. Alternatively, if the difference between the coolant temperature and the ambient temperature is less than the first threshold value (block 306: No), the method 300 moves to block 312. At block 312, the ECM 126 keeps monitoring the signals from the sensors 208. On the other hand, at block 308, the ECM compares the ambient temperature with the second threshold.

At block 310, the ECM may determine the compressed air temperature and compare it with the third threshold. According to an embodiment of the present disclosure, the method 300 moves to block 314 if the compressed air temperature is greater than, or equal to the third threshold (block 310: Yes). In an embodiment, at block 314 the ECM activates the first valve 134 while not activating the heater 136. In this case, the method 300 provides compressed air to the aftertreatment system 122 to perform convection cooling to reduce the temperature gradient and heat flux across the housing of the aftertreatment system 122. At block 310, if the compressed air temperature is less than the third threshold (block 310: No), the method 300 moves to block 316 to activate both the first valve 134 and the heater 136. The heated airflow can effectively avoid potential thermal shocks by reducing the temperature gradient across the aftertreatment housing while keeping the thermal stress of the aftertreatment internal surface within design limits.

Furthermore, at block 308 the ECM 126 may determine if the ambient temperature is less than the second threshold (block 308: Yes), and the method 300 moves to block 316 to activate both the first valve 134 and the heater 136 to provide external heating to the aftertreatment system 122 to help in cold starting of the engine system 100. Alternatively, at block 308, if the ambient temperature is greater than the second threshold (block 308: No), and the method 300 moves to block 318 to deactivate both the first valve 134 and the heater 136 to provide no external heating to the aftertreatment system 122.

Figure 4:
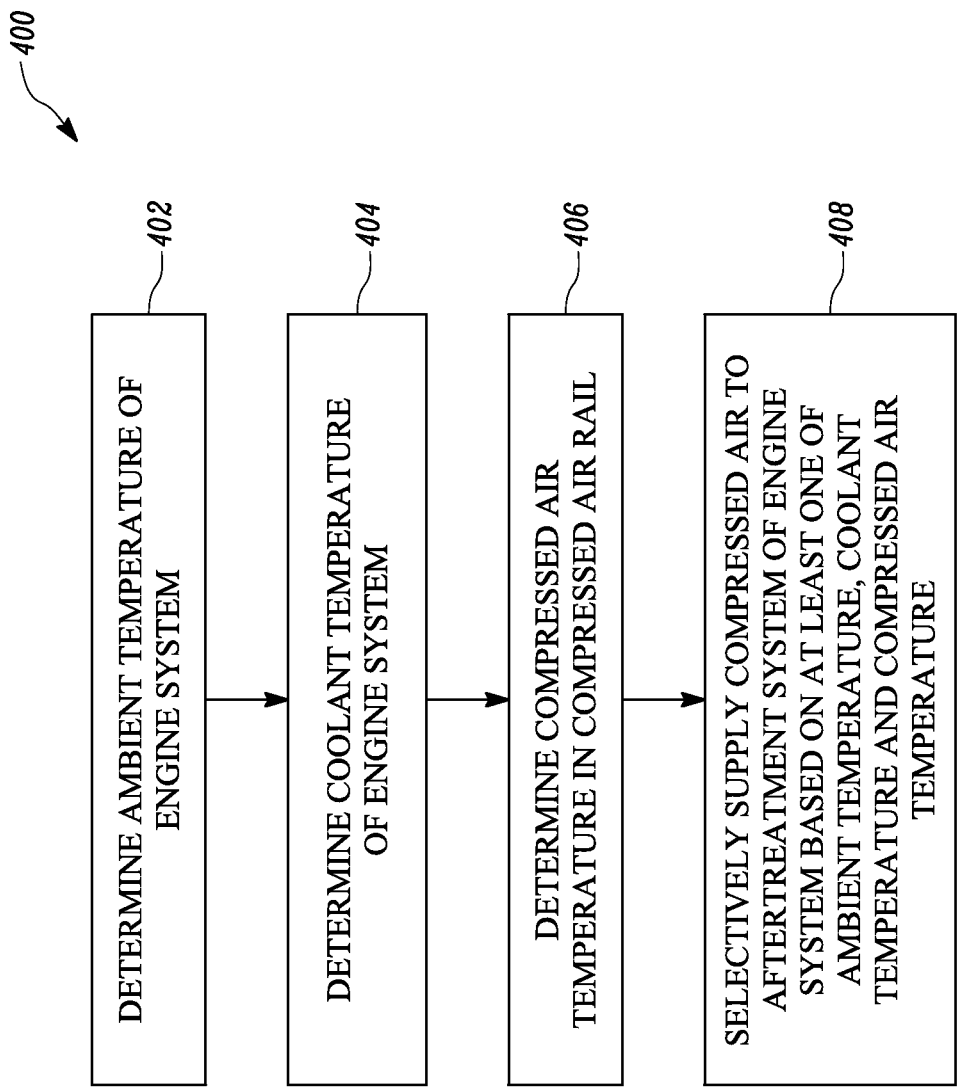
FIG. 4 illustrates a flowchart of a method for operating the engine system according to an embodiment of the present disclosure.

FIG. 4 illustrates a flowchart of a method 400 for operating the engine system 100 according to an embodiment of the present disclosure. At block 402, the method 400 includes, determining an ambient temperature of the engine system 100. The ambient temperature of the engine system 100 may be defined as the temperature of the surroundings of the engine system 100.

At block 404, the method 400 includes, determining a coolant temperature of the engine system 100. The coolant temperature may be the measure of the temperature of the coolant used in the engine system 100. At block 406, the method 400 includes, determining a compressed air temperature in the compressed air rail 132. At block 408, the method 400 includes, selectively supplying compressed air to the aftertreatment system 122 of the engine system 100 based on at least one of the ambient temperature, the coolant temperature and the compressed air temperature.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A thermal management system for an aftertreatment system of an engine, the thermal management system comprising:
   an air pump;
   a compressed air rail fluidly connected with the air pump;
   a first valve located between the compressed air rail and an exhaust outlet pathway, and configured to selectively supply air to the aftertreatment system of the engine; and
   a heater located between the compressed air rail and the first valve, and configured to heat the air before supplying air to the aftertreatment system of the engine.

2. The thermal management system of claim 1, further comprising a second valve located between the compressed air rail and an air intake pathway of the engine.

3. The thermal management system of claim 1 further comprising a relief valve connected with the compressed air rail.

4. The thermal management system of claim 1, wherein the compressed air rail comprises a double-layered housing with an outer casing and an inner casing.

5. The thermal management system of claim 4, wherein the compressed air rail further comprises a coolant passage located between the outer casing and the inner casing.

6. The thermal management system of claim 1, wherein the first valve is a two-way two-position valve.

7. The thermal management system of claim 2, wherein the second valve is a two-way two-position valve.

8. An engine system comprising:
   an engine;
   an air intake pathway to supply air to the engine;
   an exhaust outlet pathway to route exhaust gases out from the engine;
   an aftertreatment system to treat the exhaust gases; and
   a thermal management system for the aftertreatment system, the thermal management system including:
     an air pump;
     a compressed air rail fluidly connected with the air pump;
     a first valve located between the compressed air rail and the exhaust outlet pathway, and configured to selectively supply air to the aftertreatment system of the engine; and
     a heater located between the compressed air rail and the first valve, and configured to heat the air before supplying air to the aftertreatment system of the engine.

9. The engine system of claim 8, wherein the thermal management system further comprising a second valve located between the compressed air rail and an air intake pathway of the engine.

10. The engine system of claim 8, wherein the thermal management system further comprising a relief valve connected with the compressed air rail.

11. The engine system of claim 8, wherein the compressed air rail comprises a double-layered housing with an outer casing and an inner casing.

12. The engine system of claim 11, wherein the compressed air rail comprises a coolant passage located between the outer casing and the inner casing.

13. The engine system of claim 8, wherein the first valve is a two-way two-position valve.

14. The engine system of claim 8, wherein the second valve is a two-way two-position valve.

* * * * *